(12) United States Patent
Kreuzer et al.

(10) Patent No.: US 12,249,929 B2
(45) Date of Patent: Mar. 11, 2025

(54) METHOD FOR OPERATING AN INVERTER ASSEMBLY AND INVERTER ASSEMBLY FOR CARRYING OUT THE METHOD

(71) Applicant: Fronius International GmbH, Pettenbach (AT)

(72) Inventors: Harald Kreuzer, Pettenbach (AT); Roland Pieler, Pettenbach (AT); Christoph Pernegger, Pettenbach (AT); Richard Grasboeck, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 18/722,673

(22) PCT Filed: Dec. 22, 2022

(86) PCT No.: PCT/EP2022/087441
§ 371 (c)(1),
(2) Date: Jun. 21, 2024

(87) PCT Pub. No.: WO2023/118417
PCT Pub. Date: Jun. 29, 2023

(65) Prior Publication Data
US 2024/0421725 A1 Dec. 19, 2024

(30) Foreign Application Priority Data
Dec. 23, 2021 (EP) .................. 21217364

(51) Int. Cl.
*H02M 7/5395* (2006.01)
*H02M 1/00* (2007.01)
*H02M 1/12* (2006.01)

(52) U.S. Cl.
CPC ......... *H02M 7/5395* (2013.01); *H02M 1/007* (2021.05); *H02M 1/12* (2013.01)

(58) Field of Classification Search
CPC ........ H02M 1/12; H02M 1/007; H02M 7/537; H02M 7/493; H02M 1/44
See application file for complete search history.

(56) References Cited

U.S. PATENT DOCUMENTS 6,930,868 B2 * 8/2005 Kondo .................. H02H 3/337
361/42
8,760,069 B2 6/2014 Braun et al.
(Continued)

FOREIGN PATENT DOCUMENTS

CN 110323959 A * 10/2019 .............. H02M 1/12
EP 1 229 629 A2 8/2002
(Continued)

OTHER PUBLICATIONS

Machine Translation for CN110323959 (Year: 2019).*
(Continued)

*Primary Examiner* — Thienvu V Tran
*Assistant Examiner* — Yahveh Comas Torres
(74) *Attorney, Agent, or Firm* — Collard & Roe, P.C.

(57) ABSTRACT

In a method for operating an inverter assembly and inverter assembly for carrying out the method, to reduce the risk of triggering a ground fault circuit interrupter, before feeding in the alternating voltage, the leakage capacitance to ground is determined at the DC input of each inverter, and which AC output is connected to which line of the supply network is determined, and, taking into consideration the leakage capacitance and a defined maximum leakage current and the connection situation at the AC output, the power units are asymmetrically modulated so that the amplitudes of the voltages at the AC outputs of the power units differ in size. The voltage with the greater amplitude comes about at the AC output of this power unit connected to the phase connection. The voltage with the lower amplitude comes about
(Continued)

at the AC output of the power unit connected to the neutral conductor.

13 Claims, 9 Drawing Sheets

(56) References Cited

U.S. PATENT DOCUMENTS

| | | | |
|---|---|---|---|
| 10,530,274 B2 | 1/2020 | Mueller et al. | |
| 11,614,475 B2* | 3/2023 | Fischereder | G01R 31/1227 |
| | | | 324/551 |
| 11,656,256 B2 | 5/2023 | Fischereder et al. | |
| 2002/0105765 A1* | 8/2002 | Kondo | H02H 7/1222 |
| | | | 361/42 |
| 2006/0170371 A1 | 8/2006 | Lyle, Jr. et al. | |
| 2009/0296289 A1* | 12/2009 | Valdez | H02H 3/17 |
| | | | 361/47 |
| 2019/0225088 A1* | 7/2019 | Masuda | B60L 53/00 |
| 2019/0393802 A1* | 12/2019 | Gao | H02M 7/537 |

FOREIGN PATENT DOCUMENTS

| | | | |
|---|---|---|---|
| EP | 2 787 628 A1 | 10/2014 | |
| EP | 3 465 897 B1 | 7/2019 | |
| EP | 3 576 245 A1 | 12/2019 | |
| EP | 3 879 277 A1 | 9/2021 | |
| EP | 3 879 283 A1 | 9/2021 | |
| JP | 2011-172485 A | 9/2011 | |
| WO | 2010/045980 A1 | 4/2010 | |
| WO | 2014/079775 A1 | 5/2014 | |
| WO | WO-2021180747 A1 * | 9/2021 | ............. G01R 15/04 |

OTHER PUBLICATIONS

International Search Report of PCT/EP2022/087441, mailed Apr. 3, 2023.

European Search Report dated Jun. 15, 2022 in European Application No. 21217364.5, with English translation.

* cited by examiner

METHOD FOR OPERATING AN INVERTER ASSEMBLY AND INVERTER ASSEMBLY FOR CARRYING OUT THE METHOD

CROSS REFERENCE TO RELATED APPLICATIONS

This application is the National Stage of PCT/EP2022/087441 filed on Dec. 22, 2022, which claims priority under 35 U.S.C. § 119 of European Application No. 21217364.5 filed on Dec. 23, 2021, the disclosure of which is incorporated by reference. The international application under PCT article 21(2) was not published in English.

The invention relates to a method for operating an inverter assembly having at least one inverter for converting respectively a direct voltage into an alternating voltage with a mains frequency, wherein in each inverter the direct voltage of a DC source connected to a DC input is transformed via a DC/DC-converter to an intermediate circuit voltage, and the intermediate circuit voltage is converted in a DC/AC-converter having two power units which are each connected to an AC output and are mutually modulated by a control device, into the alternating voltage and is output at the AC outputs, and the alternating voltage is fed into a supply network connected to the AC outputs.

Furthermore the invention relates to an inverter assembly having at least one inverter for converting respectively a direct voltage into an alternating voltage with a mains frequency, wherein each inverter has a DC/DC-converter for transforming the direct voltage of a DC source connected to a DC input into an intermediate circuit voltage, a DC/AC-converter having two power units for converting the intermediate circuit voltage into the alternating voltage, wherein a control device is provided for modulating the power units of each inverter.

The term inverter assembly includes assemblies consisting of one or a plurality of inverters, each of which is connected to corresponding DC sources, in particular photovoltaic modules or strings on photovoltaic modules at the input, and the output of which is connected to the supply network. In the case of an inverter assembly having a plurality of inverters, all inverters can be controlled independently of one another or they can be connected to one another via communication lines, so that their functions can be coordinated.

In particular, the present invention relates to advanced single-phase inverters without a transformer (transformerless inverters), which convert a direct voltage into an alternating voltage with a mains frequency by transforming the direct voltage of a direct voltage source, for example a photovoltaic module, via a DC/DC-converter to an intermediate circuit voltage and converting the intermediate circuit voltage in a DC/AC-converter to the desired alternating voltage, which is used to operate loads or to feed into a supply network. The DC/AC-converter has two power units having semiconductor switches, which are correspondingly modulated by a control device. In contrast to inverters with transformers, transformerless inverters have a much higher efficiency.

Inverters without transformers and without galvanic insulation generate a mains-dependent potential change due to the modulation (pulse-width modulation PWM) at the DC source, in particular at the photovoltaic generator. This potential change generates leakage currents to ground due to unavoidable parasitic capacitances and insulation resistances between components of the inverter assembly, in particular between the photovoltaic modules, and the ground. Leakage currents which are impermissibly high can lead to a mandatory residual current circuit interrupter (ground fault circuit interrupter) being triggered when the inverter is connected to the supply network. Triggering the ground fault circuit interrupter, might also unintentionally disconnect other apparatuses from the supply network. Switching on the ground fault circuit interrupter requires manual activity and thus the presence of a person. For this reason, it is common to determine the leakage current or the leakage capacitance responsible for it and, if necessary, the insulation resistance and, in case a maximum permissible leakage current is exceeded, to prevent the inverter from being connected to the supply network. Only after the causes of the high leakage current have been eliminated and the ground fault circuit interrupter has been closed again is the alternating voltage generated in the inverter available again for supplying loads with electrical energy or for feeding into the supply network. Before that, the converted energy cannot be used, which translates into a worse energy balance. As a result, the operator of the inverter assembly loses valuable feed-in time, feed-in power and feed-in energy and thus money. The lost feed-in time, feed-in power and feed-in energy increases proportionally with the size of the inverter assembly. In high-performance systems very high yield losses can occur.

EP 3 465 897 B1 describes a method for operating a single transformerless inverter, wherein, when exceeding a limit value for the leakage current, the inverter is controlled accordingly or is operated with a special clock method, by means of which the leakage current can be reduced. Although this makes it possible to connect the inverter, which would otherwise not have been permissible, the resulting energy balance is nevertheless reduced and the operator has to accept corresponding yield losses. In addition, the determination of the leakage current involves a certain amount of effort.

CN 110323959 A describes a method for operating an inverter and such an inverter, wherein harmonics of the mains frequency are reduced with a filter circuit at the output of the inverter and leakage currents are reduced via an additional capacitor and an additional compensation circuit.

EP 1 229 629 A2 describes an inverter with a possibility of detecting leakage currents.

The object of the present invention is to provide an above-mentioned method for operating an inverter assembly and an inverter assembly for carrying out this method, which is intended to ensure that the inverter assembly can be connected to the supply network even at higher expected leakage currents and that the converted energy can then also be utilised for a better energy balance. The method and the inverter assembly should be as simple and cost-effective as possible to implement and should not cause any significant additional costs to the operator. Disadvantages of previous methods or devices are to be avoided or at least reduced.

With respect to the method, the object according to the invention is achieved in that, before feeding the alternating voltage into the supply network, the leakage capacitance to ground is determined at the DC input of each inverter, and it is determined which AC output is connected to which line of the supply network, and, taking into consideration the leakage capacitance and a defined maximum leakage current and the determined connection situation at the AC output, the power units of each inverter are asymmetrically modulated in such a way that the amplitudes of the voltages at the AC outputs of the power units differ in size, the modulation of the power unit of the DC/AC-converter connected to the phase connection of the supply network taking place in such a way that the voltage with the greater amplitude comes about at the AC output of this power unit, and the modulation of the power unit of the DC/AC-converter connected to the neutral conductor of the supply network takes place in such a way that, the voltage with the lower amplitude comes about at the AC output of this power unit. Without measuring the actual leakage current, the method according to the invention provides for determining the leakage capacitance at the DC input of each inverter and from this, when the maximum leakage current and the connection situation of the inverter at the lines of the supply network are known, correspondingly adapting the modulation of the power units of each inverter and correspondingly shifting or asymmetrically arranging the usually equally great amplitudes of the voltages at the outputs of the power units. While until now the two power units of each inverter have been modulated in such a way that opposite alternating voltages with the same amplitude come about, now the control takes place asymmetrically, with different amplitudes of the voltages at the AC outputs of the power units. As a result, the leakage currents are minimised or optimised and it is thus also possible to connect the inverter without the risk of exceeding the maximum leakage current and triggering the ground fault circuit interrupter. Thus, the respective inverter can also contribute positively to the resulting energy balance, whereas it would have to remain deactivated according to the state of the art. Since the capacitive leakage current is usually significantly greater than the ohmic leakage current, it is the leakage capacitance, i.e. the capacitive ratio of the complex insulation resistance, rather than the ohmic component, the insulation resistance, that is primarily determined and taken into consideration. The leakage capacitance or system capacitance can be determined, for example, according to the method described in EP 3 879 283 A1.

The respective connection situation of the inverter at the lines of the supply network, i.e. which AC output of the inverter is connected to the neutral conductor and which AC connection of the inverter is connected to the phase connection of the supply network, can be set by manual input on the inverter or, under certain circumstances, can also be determined automatically. For example, the connection situation can already be defined during the installation of the inverter and filed or stored in a suitable manner. The method according to the invention then accesses these filed or stored data and thus knows the connection situation. One way of automatically determining the connection situation is, for example, to measure the voltage in any present measuring unit, in order to determine the insulation resistance and then connect only one power unit to the supply network and measure the voltage in the measuring unit a second time. If in the second measurement the alternating voltage component has increased compared to the first measurement, it can be concluded that the power unit connected to the supply network is connected to the phase connection (L) of the supply network, and that the other power unit is thus connected to the neutral conductor (N). Subsequently, the control experiment can be carried out using the other power unit, i.e. only the other power unit can be connected to the supply network. Thereafter, the alternating voltage ratios of the voltages in both measurements are compared again.

The method according to the invention can be applied in particular to inverter assemblies having a plurality of inverters, i.e. more powerful systems.

Typically, the power units of each inverter are pulse-width modulated alternately at a predetermined switching frequency. Other modulation methods, which control the two power units accordingly, so that the desired output alternating voltage comes about, are also conceivable.

If, in the event that the maximum leakage current is reached, a predetermined period of time is waited and, before feeding the alternating voltage into the supply network, the leakage capacitance to ground is determined again at the DC input of each inverter and it is checked again whether the defined maximum leakage current is exceeded, after this predetermined period of time has elapsed, it can be checked again whether it is possible to connect the respective inverter of the inverter assembly without the risk of triggering the ground fault circuit interrupter. For example, the predetermined period of time can be in the range of a few minutes, for example 5 minutes. During this time, changes in the leakage capacitance may occur, which may justify a new check.

The modulation of the power units of each inverter as a function of the measured leakage capacitance is preferably changed linearly within predetermined limits. The limits are defined, for example, by extreme values of the leakage capacitance, which could indicate an incorrect determination or defective hardware of the inverter assembly.

If a reserve is taken into consideration at the predetermined limits, in addition to the leakage currents of the inverter assembly, any leakage currents of other apparatuses, for example, a washing machine connected to the supply network as a load, can also be taken into consideration.

Upon reaching predetermined upper limit values for the measured leakage capacitance of each inverter, the respective inverter preferably remains deactivated or the respective inverter is deactivated. The limit values for the leakage capacitance are selected and set based on experience.

Advantageously, before the feed-in operation of the at least one inverter, the ohmic insulation resistance to ground is also measured at the DC input of each inverter and taken into consideration in addition to the leakage capacitance when modulating the power units. As already mentioned above, the influence of the ohmic insulation resistance, in contrast to that of the leakage capacitance, is usually very small or even negligible. However, even more efficient operation of the inverter assembly can be achieved if the ohmic component of the complex insulation resistance is also taken into consideration. The ohmic insulation resistance can be determined, for example, according to the method described in EP 3 879 277 A1.

According to a further feature of the invention, the location of a connection of the DC source to the ground can be determined and the determined location can also be taken into consideration when the power units of the inverters are modulated. For example, it may be relevant for the modulation whether the ground leakage occurs in the region of the positive or negative connection of the DC input of the inverter or between individual DC sources, in particular photovoltaic modules, etc. The location at which the ohmic insulation resistance is connected to the DC source can be determined, for example, together with the determination of the ohmic insulation resistance.

Advantageously, the inverter is deactivated when the intermediate circuit voltage reaches a predetermined upper limit value. In the method according to the invention, a higher intermediate circuit voltage may be necessary, as a result of which the overall efficiency of the inverter assembly decreases. When a certain intermediate circuit voltage, for example 500 V, is exceeded, it will be useful to deactivate the inverter for safety reasons and reasons of reduced efficiency.

Before and/or during the feed-in operation of the at least one inverter, harmonics of the alternating voltage at the AC output can also be determined and taken into consideration when the power units of the inverter are modulated. Since harmonics occur in practice and influence the network situation and contribute to the leakage current, an even better utilisation of the inverters of the inverter assembly and thus an improvement of the overall energy balance can be achieved when they are taken into consideration. Harmonics in the output alternating voltage can be determined, for example, by selective filters or Fourier transformations.

The determined harmonics can be attenuated, for example, by modulating that power unit of each inverter, which is connected to the AC output, which is connected to the neutral conductor of the supply network, and this attenuation can be correspondingly corrected by modulating that power unit of each inverter, which is connected to the AC output, which is connected to the phase connection of the supply network. This represents a method of taking harmonics into consideration.

According to another feature of the invention, the direct voltage at the DC input of each inverter can be measured and taken into consideration when modulating the power units of each inverter. Taking into consideration the direct voltage of the DC source, in particular of the photovoltaic module, can bring further advantages, in particular in inverter assemblies having a plurality of inverters, since controlling the individual inverters can also be configured as a function of the individual input voltages. However, taking into consideration the direct voltage at the DC input of the inverter during modulation can be advantageous and contribute to a further increase in efficiency, even with only one inverter.

If, during the feed-in operation of the at least one inverter, the amplitude of the alternating voltage is also determined and taken into consideration when modulating the power units of each inverter, harmonics, for example, can be taken into consideration during the operation of the inverter assembly and the modulation can be optimally adapted to any changed situations.

In the case of multiple inverters, the power units of each inverter are preferably modulated as a function of the measured system capacitance of each inverter. In this case, each inverter is controlled or modulated independently of the other inverters in such a way that the proportionately determined maximum leakage current does not occur with each inverter and the respective inverter can thus contribute to the energy balance.

In the simplest case, in an inverter assembly having a plurality of inverters, the defined maximum leakage current can be divided by the number of all inverters of the inverter assembly.

The number of inverters of the inverter assembly can preferably be determined automatically via communication lines between the inverters. If, in addition to the number of inverters, the direct voltage at the input of each inverter is also measured and taken into consideration, a particularly yield-optimised variant of the invention can be implemented.

The object according to the invention is likewise achieved by an above-mentioned inverter assembly, which is configured for carrying out the above-mentioned method. The functions of the inverter assembly can be implemented relatively easily in terms of software in the control device of the inverters. With regard to the achievable advantages, reference is made to the above description of the method.

The present invention is further explained with reference to the appended figures, in which.

Figure 1:
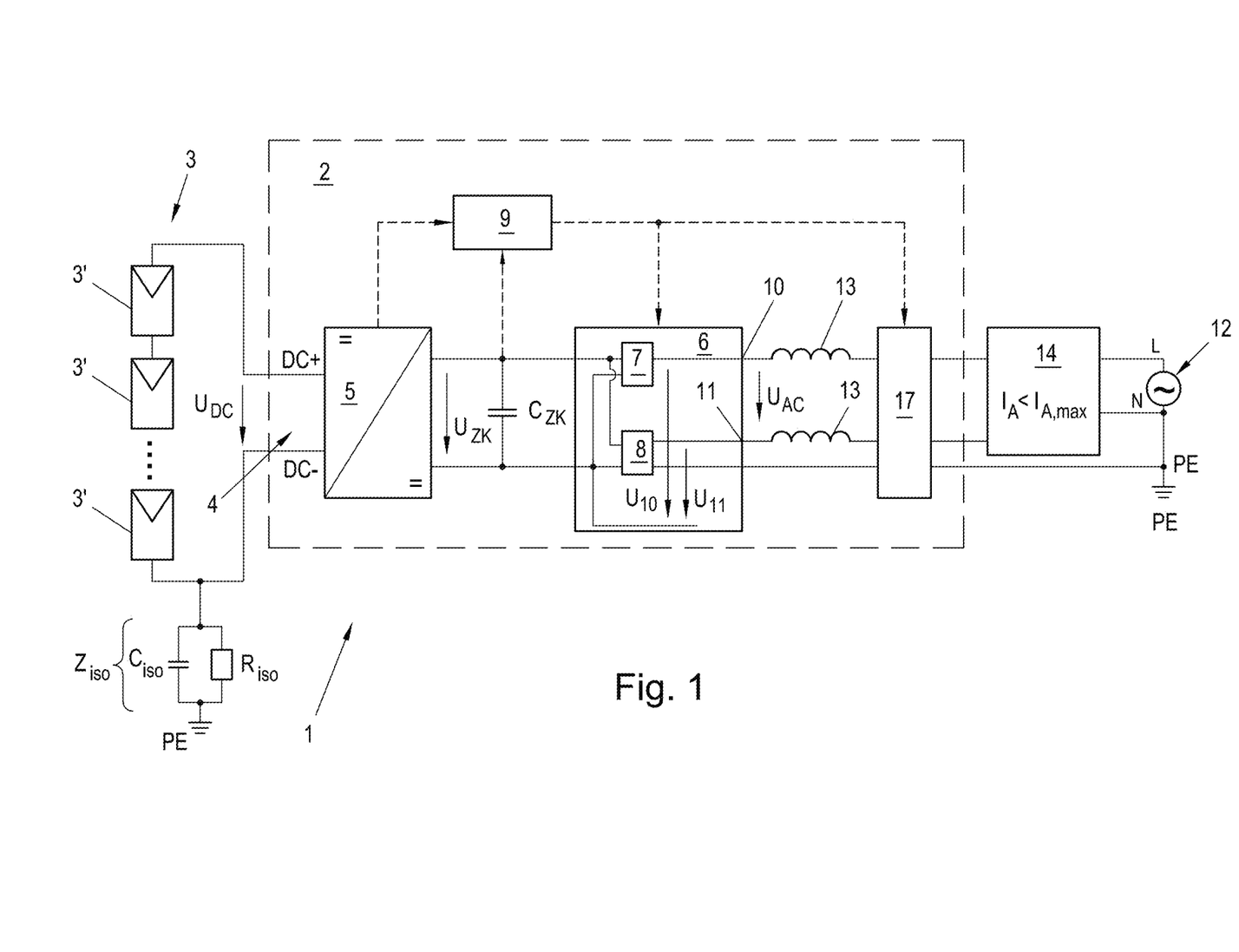
FIG. 1 shows a block diagram of an inverter assembly having an inverter.

FIG. 1 shows a block diagram of an inverter assembly having a single-phase transformerless inverter 2. The inverter 2 is used to convert a direct voltage $U_{DC}$, which is provided by a DC source 3, in particular a photovoltaic module 3' or a string of a plurality of photovoltaic modules 3', into an alternating voltage $U_{AC}$ with a mains frequency $f_{AC}$ at the output of the inverter 2. The inverter 2 includes a DC/DC-converter 5 for transforming the direct voltage $U_{DC}$ at the DC input 4 into an intermediate circuit voltage $U_{ZK}$ at an intermediate circuit capacitor $C_{ZK}$. The DC/DC-converter 5 is preferably formed by a step-up converter (boost converter). The intermediate circuit voltage $U_{ZK}$ is converted in a DC/AC-converter 6 into the alternating voltage $U_{AC}$. To this end, the DC/AC-converter 6 has two power units 7, 8, usually having corresponding semiconductor switches in bridge connection (not shown), which are alternately controlled so that an alternating voltage $U_{AC}$ comes about at the output of the DC/AC-converter 6. A corresponding control device 9 is provided for modulating the power units 7, 8. Pulse width modulation usually takes place at a predetermined switching frequency. The voltage $U_{10}$ is applied at the AC output 10 of the power unit 7 opposite the lower input of the power unit 7 (or the negative pole of the intermediate circuit voltage $U_{ZK}$) and the voltage $U_{11}$ is applied at the AC output 11 of the power unit 8 opposite the lower input of the power unit 8 (or the negative pole of the intermediate circuit voltage $U_{ZK}$). The two AC outputs 10 and 11 of the power units 7, 8 of the DC/AC-converter 6 together form the output of the inverter 2, to which the alternating voltage $U_{AC}$ is applied, and which is connected to the single-phase supply network 12. In the example shown, the AC output 10 of the power unit 7 is connected to the phase connection L and the AC output 11 of the power unit 8 is connected to the neutral conductor N of the supply network 12. Output chokes 13 may be arranged in the lines at the output of the inverter 2. In addition, an AC isolator 17 is located at the output of the inverter 2, with which the inverter 2 can be isolated from the supply network 12. Arranged between the inverter 2 and the supply network 12 is a ground fault circuit interrupter 14, which measures a total current and triggers when a defined maximum leakage current $I_{A,max}$ to ground PE is exceeded. The leakage currents $I_A$ come about due to insulation faults, which are represented by a complex insulation resistance $Z_{iso}$ in the form of a parallel connection of a leakage capacitance $C_{iso}$ and an insulation resistance $R_{iso}$ between the DC sources 3 and ground PE. The location of the insulation fault, i.e. at which point of the DC source 3 the ohmic insulation resistance $R_{iso}$ is connected to the DC source 3, also influences the direct component of the leakage current $I_A$. The symmetrical arrangement of the insulation fault between the two connections of the DC input 4 of the inverter 2 would be ideal, as this results in the lowest direct component of the leakage current $I_A$, because the voltage to ground PE is at its absolute lowest in the centre when the inverter 2 is in feed-in mode. Therefore, under certain circumstances, a determination of the location of the connection of the DC source 3 to the ground PE is advantageous. This determination may be part of the measurement of the ohmic insulation resistance $R_{iso}$, for example. If the location is known, the direct component of the leakage current $I_A$ can be determined using Ohm's law by dividing the measured voltage of the insulation fault to the ground PE by the ohmic insulation resistance $R_{iso}$. The direct component of the leakage current $I_A$ reduces the permitted capacitive ratio of the leakage current $I_A$, which is to be taken into consideration for the modulation of the power units 7, 8.

In order to prevent triggering of the ground fault circuit interrupter 14, the leakage current $I_A$ is measured before connecting the inverter 2 to the supply network 12 via the AC isolator 17, or the leakage capacitance $C_{iso}$ and, if necessary, the ohmic insulation resistance $R_{iso}$ are determined, and the inverter 2 is only connected if the defined maximum leakage current $I_{A,max}$ is not reached. Otherwise, the inverter 2 cannot be connected to the supply network 12 and the alternating voltage $U_{AC}$ converted from the direct voltage $U_{DC}$ cannot be fed into the supply network 12 and thus cannot contribute to the energy balance. Of course, this entails yield losses for the operator of the inverter assembly 1, which are particularly significant in the case of large and high-performance systems.

According to the invention, the modulation of the power units 7, 8 of each inverter 2 is adapted, taking into consideration the determined leakage capacitance $C_{iso}$ and the defined maximum leakage current $I_{A,max}$ and the determined connection situation, in such a way that the amplitudes of the voltages $U_{10}$, $U_{11}$ at the outputs 10, 11 of the power units 7, 8 result to be different or asymmetrical. As a result, the leakage current $I_A$ is minimised or optimised ($I_{A,opt}$) and it is thus also possible to connect the inverter 2 without the risk of exceeding the maximum leakage current $I_{A,max}$ and triggering the ground fault circuit interrupter 14. Thus, the respective inverter 2 can also contribute positively to the resulting energy balance, whereas it would have to remain deactivated according to the state of the art.

Figure 2:
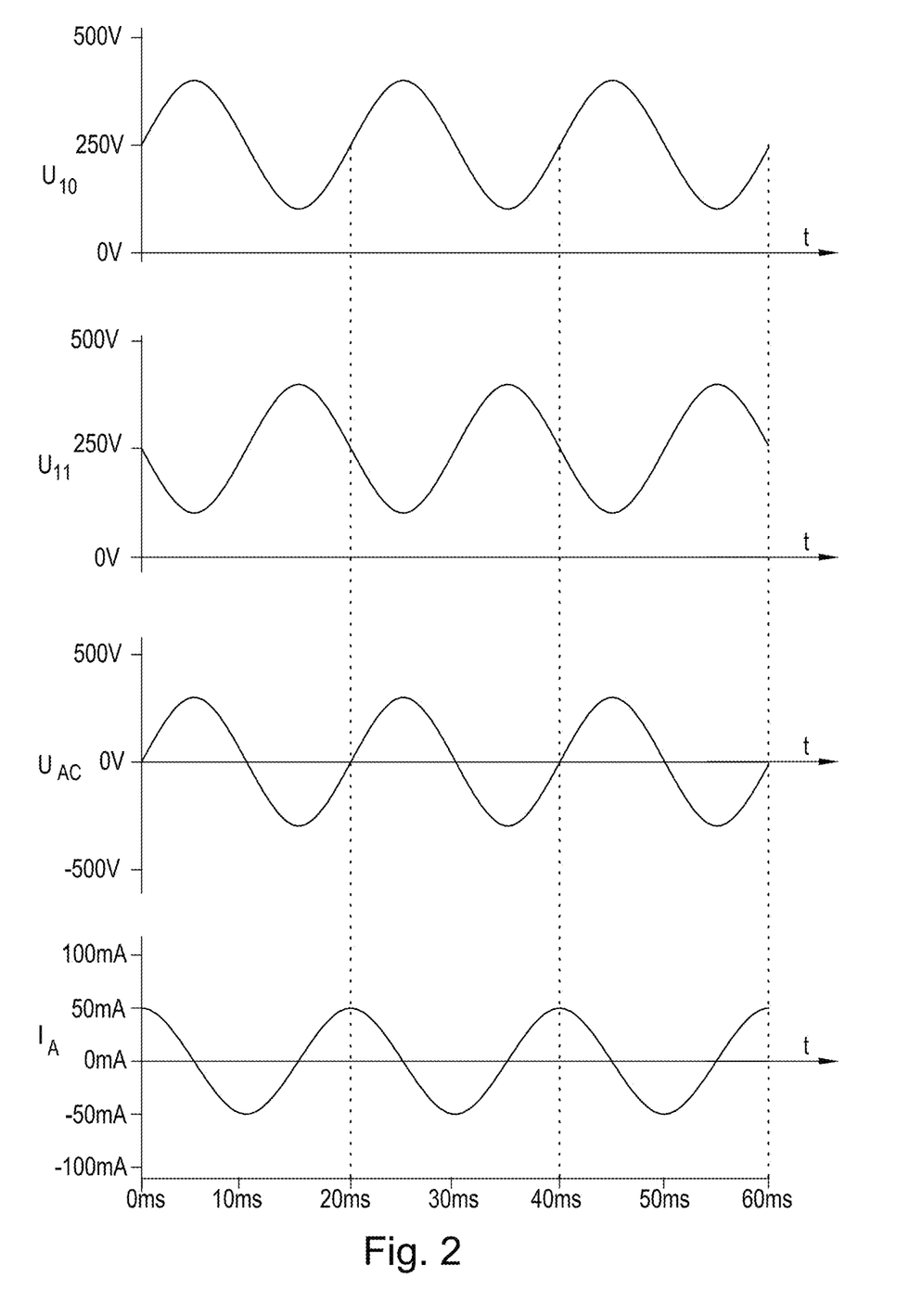
FIG. 2 shows the time curves of the voltages at the AC outputs of the power units and the resulting alternating voltage of the inverter and the resulting leakage current according to the state of the art.

FIG. 2 shows the time curves of the voltages $U_{10}$, $U_{11}$ at the AC outputs 10, 11 of the power units 7, 8 and the resulting alternating voltage $U_{AC}$ of the inverter 2 and the resulting leakage current according to the state of the art. The AC output 10 of the power unit 7 of the inverter 2 is connected to the phase connection L in accordance with the block diagram of the inverter assembly 1 according to FIG. 1, and the AC output 11 of the power unit 8 of the inverter 2 is connected to the neutral conductor N of the supply network 12. The modulation of the power units 7, 8 of the DCTAC-converter 6 of the inverter 2 takes place in such a way that the two voltages $U_{10}$ and $U_{11}$ are output in opposite directions with the same amplitude. The maximum possible amplitude of the voltages $U_{10}$ and $U_{11}$ would be the maximum intermediate circuit voltage $U_{ZK}$, here 500 V. As shown, an amplitude of 325 V was selected. The amplitude of the alternating voltage $U_{AC}$ is also 325 V, i.e. the voltage of the supply network 12. From this, a leakage current $I_A$ comes about (in this case, for example, with an amplitude of 50 mA and a root mean square value of 35 mA), which is not influenced by the modulation.

Figure 3:
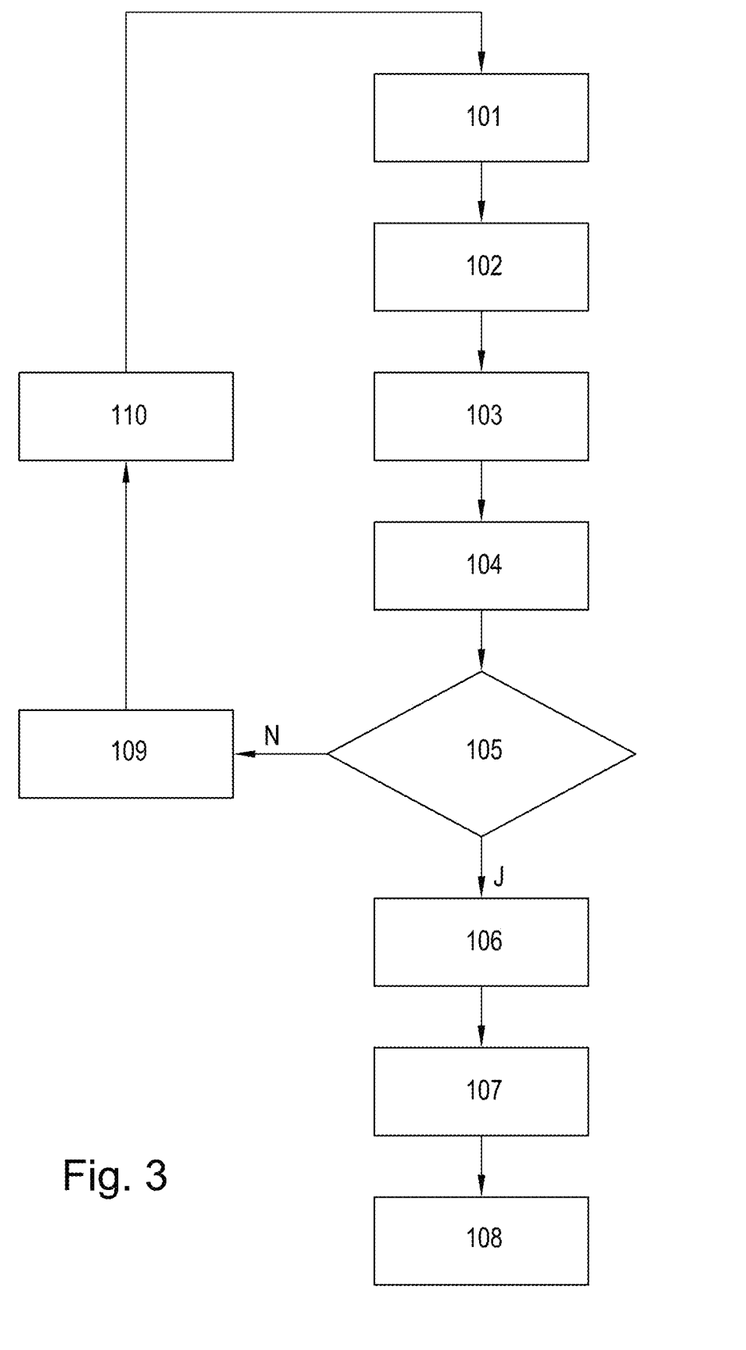
FIG. 3 shows a flow diagram for illustrating a first embodiment of a method according to the invention for operating an inverter assembly.

FIG. 3 shows a flow diagram for illustrating a first embodiment of a method according to the invention for operating an inverter assembly 1. According to step 101, the leakage capacitance $C_{iso}$ and possibly also the ohmic insulation resistance $R_{iso}$ is determined using a known method and according to step 102, the capacitive ratio of the insulation resistance $X_{iso}$ is calculated from the leakage capacitance $C_{iso}$ and the mains frequency $f_{AC}$ by $$X_{iso} = \frac{1}{2 \cdot \pi \cdot f_{AC} \cdot C_{iso}}$$

According to step 103 of the method, subsequently, the defined maximum leakage current $I_{A,max}$ is determined. In the case of an inverter 2 and a ground fault circuit interrupter 14, the maximum leakage current $I_{A,max}$ is defined by this ground fault circuit interrupter 14, as it is designed for a certain maximum leakage current $I_{A,max}$, for example 30 mA. In the case of a plurality of inverters 2 within the inverter assembly 1 (see FIG. 9), the defined maximum leakage current $I_{A,max}$ is divided by the number i of inverters 2, for example, in order to define the maximum leakage current per inverter 2. However, the maximum Leakage current $I_{A,max}$, which is defined by the ground fault circuit interrupter 14, applies here too.

According to step 104, the lower amplitude of the voltages $U_{10}$ or $U_{11}$ is calculated. This is done by multiplying the maximum leakage current $I_{A,max}$ by the capacitive ratio of the insulation resistance $X_{iso}$. In the case of a leakage capacitance $C_{iso}=1$ µF, for example, at a network frequency $f_{AC}=50$ Hz, a $X_{iso}=3.18$ kOhm comes about, and at an intermediate circuit voltage $U_{ZK}=500$ V, the lower amplitude of the voltages $U_{10}$, $U_{11}$ follows with approximately 75 V. The greater amplitude of the voltages $U_{10}$, $U_{11}$ follows by subtracting the lower amplitude from the alternating voltage of 325 V of the supply network 12 (as the product of the root of 2 and the voltage of 230 V), with approximately 250 V. However, since certain tolerances (for example +/−10%) are also realistic in the supply network 12, the voltage of the supply network 12 can also be measured continuously in order to obtain a current value. Accordingly, the amplitude of the alternating voltage $U_{AC}$ must also be 325 V or correspond to the current measured value. The alternating voltage $U_{AC}$ corresponds to the total of the voltages $U_{10}$ and $U_{11}$ at the AC outputs 10, 11 of the two power units 7, 8 of the inverter 2.

At this point in time, the connection situation has not yet been determined, i.e. it is not yet known which AC output 10, 11 is connected to the phase conductor L or to the neutral conductor N of the supply network 12. However, this is also not relevant for the basic determination at this point in time.

According to inquiry 105, it is checked whether the determined greater amplitude of the voltages $U_{10}$, $U_{11}$ is lower than half the intermediate circuit voltage $U_{ZK}/2$. If this is the case, it can be fed in. If this is not the case, feeding in is not possible. In the case of an intermediate circuit voltage $U_{ZK}$ of 500 V (amplitude), the greater amplitude of the voltage $U_{10}$ or $U_{11}$ may be a maximum of 250 V.

If this condition—i.e. the amplitude of the greater amplitude of the voltage $U_{10}$ or $U_{11}$ does not exceed half the intermediate circuit voltage $U_{ZK}/2$—is met, the connection situation is first determined in accordance with step 106, i.e. it is determined which AC output 10, 11 of the inverter 2 is connected to which line L, N of the supply network 12.

The AC isolator 17, which comprises at least one relay per conductor, is arranged at the output of the inverter 2. These relays can be controlled accordingly, for example by the control device 9 and/or by the power units 7, 8. As soon as the relay in the phase conductor L is closed, a sufficiently great alternating voltage component at 50 Hz with respect to ground PE can be measured, for example by the control device 9. This is not the case when closing the relay in the neutral conductor N. In this way, for example, the connection situation can be determined automatically. Typically, the contacts of the relays of the AC isolator 17 are periodically checked to see if they stick. The automatic determination of the connection situation can also take place during this test.

According to step 107, a corresponding modulation of the power units 7, 8 of each inverter 2 is then carried out. The power unit 7 at the neutral conductor N is modulated in such a way that the voltage $U_{10}$ with the lower amplitude is established at the output 10. The power unit 8 at the phase conductor L is modulated in such a way that the voltage $U_{11}$ with the higher amplitude results at the output 11. This causes the leakage current $I_A$ not to exceed the maximum leakage current $I_{A,max}$ and, accordingly, the ground fault circuit interrupter 14 not to be triggered. Provided that the leakage current $I_A$ moves in a range in which a reduction below the maximum leakage current $I_{A,max}$ is possible through the modulation of the power units 7, 8.

Accordingly, according to step 108, the inverter assembly 1 is operated in such a way that the power units 7, 8 output different voltages $U_{10}$, $U_{11}$ at the AC outputs 10, 11, so that the maximum leakage current $I_{A,max}$ is not exceeded and the inverter 2 is operated with an optimised leakage current $I_{A,opt}$.

If the above condition of the inquiry 105 is not met, according to step 109, no feeding into the supply network 12 takes place, by not connecting the respective inverter 2 to the supply network 12.

In this case, according to step 110, a predetermined period of time $\Delta t$, for example 5 min, is preferably waited and the determination of the leakage capacitance $C_{iso}$ according to step 101 is started again. During the period of time $\Delta t$, an attempt can also be made to increase the intermediate circuit voltage $U_{ZK}$. For example, with a booster from 500 to 550 V (depending on the intermediate circuit capacitors used and the topology of the inverter).

Figure 4:
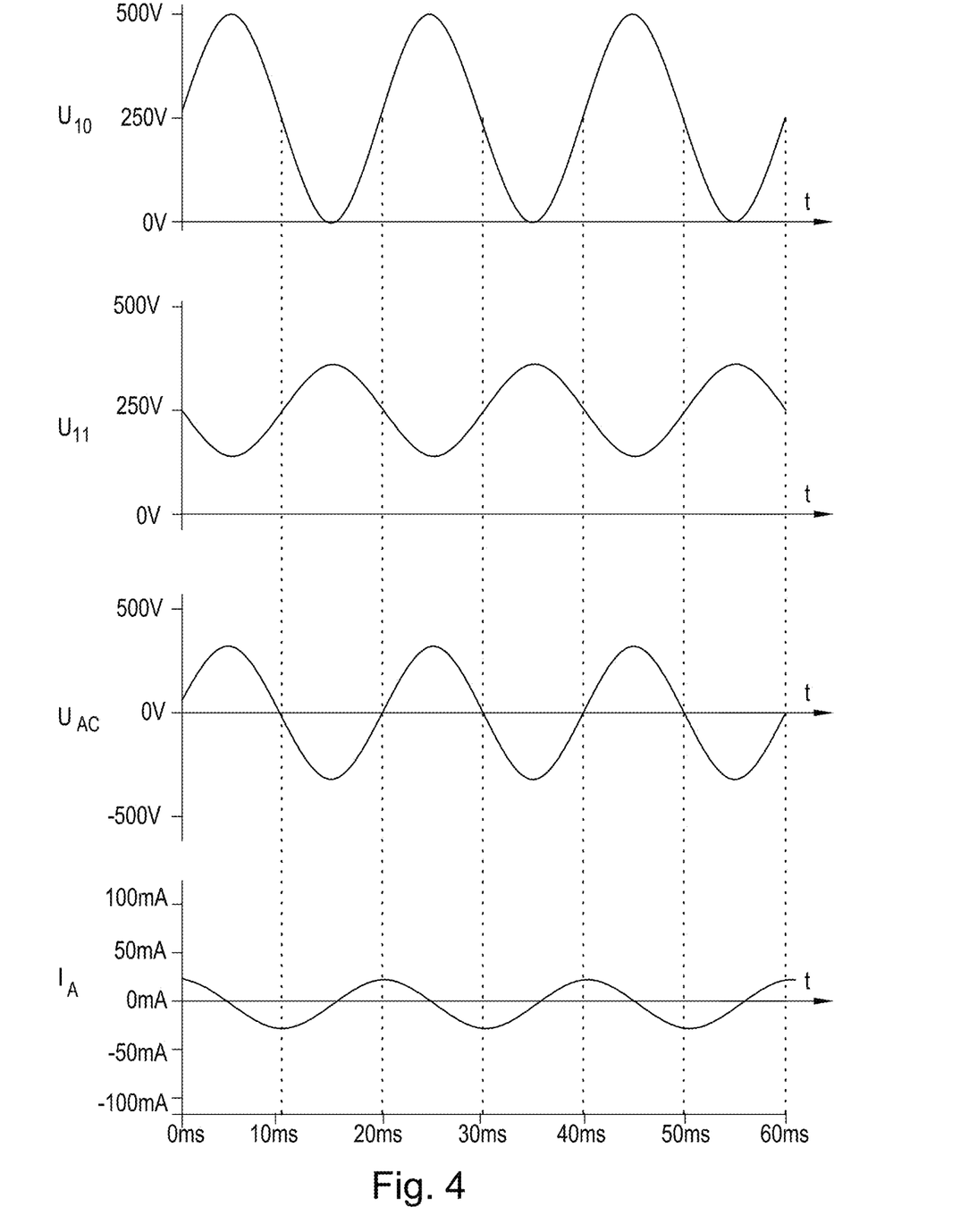
FIG. 4 shows the time curves of the voltages at the AC outputs of the power units and the resulting alternating voltage of the inverter and the resulting leakage current at an ideal supply network according to the method of the invention.

FIG. 4 shows the time curves of the voltages $U_{10}$, $U_{11}$ at the AC outputs 10, 11 of the power units 7, 8 and the resulting alternating voltage $U_{AC}$ of the inverter 2 and the resulting leakage current $I_A$ in the method according to the invention, under the condition of an ideal supply network 12 without harmonics. According to the invention, before feeding the alternating voltage $U_{AC}$ into the supply network 12, the leakage capacitance $C_{iso}$ to ground is determined at the DC input 4 of each inverter 2 PE, and the voltages $U_{10}$, $U_{11}$ of the power units 7, 8 are determined according to the flow diagram in FIG. 3, and the power units 7, 8 are modulated accordingly, so that the voltages $U_{10}$, $U_{11}$ come about with the corresponding different amplitudes.

In the exemplary embodiment shown according to FIG. 1, the AC output 10 of the power unit 7 of the inverter 2 is connected to the phase connection L and the AC output 11 of the power unit 8 of the inverter 2 is connected to the neutral conductor N of the supply network 12. Accordingly, the voltage $U_{11}$ with the lower amplitude is output by the power unit 8, and the voltage $U_{10}$ with the greater amplitude is output by the power unit 7. As shown, the amplitude of the voltage $U_{10}$ is approximately 250 V and the amplitude of the voltage $U_{11}$ is approximately 75 V. Correspondingly, an amplitude of 325 V (230 V times square root of 2), which corresponds to the amplitude of the supply voltage 12, results for the alternating voltage $U_{AC}$.

As previously described, the lower voltage fluctuations at the neutral conductor N thus have a positive effect on the level of the leakage current $I_A$.

The asymmetric modulation of the power units 7, 8 comes about in an optimised leakage current $I_{A,opt}$, which has a lower amplitude compared to the leakage current $I_A$ of the prior art (FIG. 2). In the example shown, the amplitude of the optimised leakage current $I_{A,opt}$ is about 23 mA, or corresponding to a root mean square value of about 16 mA. A conventional ground fault circuit interrupter 14 triggers, for example, at a maximum leakage current $I_{A,max}$ of 30 mA. Accordingly, the optimised leakage current $I_{A,opt}$ can be kept low with the method according to the invention before and during the operation of the inverter 2, so that it remains below the maximum leakage current $I_{A,max}$, as long as the conditions (low insulation resistance, high leakage capacitance, few mains interruptions, hardly any harmonics, etc.) permit this. Accordingly, the inverter 2 can feed into the supply network 12 for a longer period of time (connect earlier, disconnect later) and thus contribute more to the energy balance.

Figure 5:
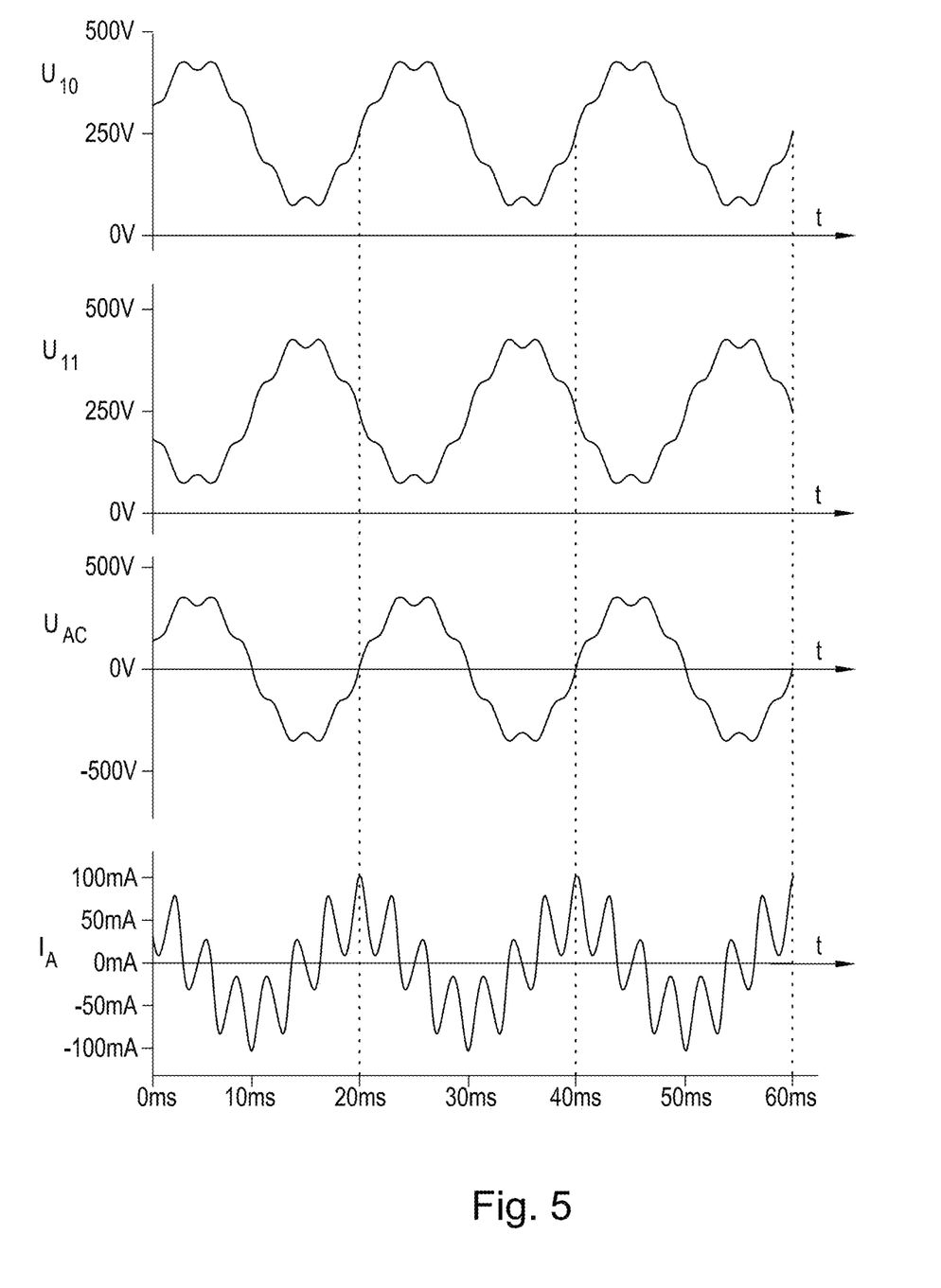
FIG. 5 shows the time curves of the voltages at the AC outputs of the power units and the resulting alternating voltage of the inverter and the resulting leakage current in a supply network with harmonics according to the state of the art.

FIG. 5 shows the time curves of the voltages $U_{10}$, $U_{11}$ at the AC outputs 10, 11 of the power units 7, 8 and the resulting alternating voltage $U_{AC}$ of the inverter 2 and the resulting leakage current according to the state of the art in a supply network 12 with harmonics. The harmonics come about from faults in the supply network 12, which are superimposed on the voltages $U_{10}$, $U_{11}$. Correspondingly, these high-frequency faults also superimpose the leakage current $I_A$, as a result of which its amplitude increases, as shown to approximately 80 mA or a root mean square value of approximately 43 mA, since the voltage fluctuations of the voltage $U_{11}$ at the AC output 11 of the power unit 8 are correspondingly amplified.

Figure 6:
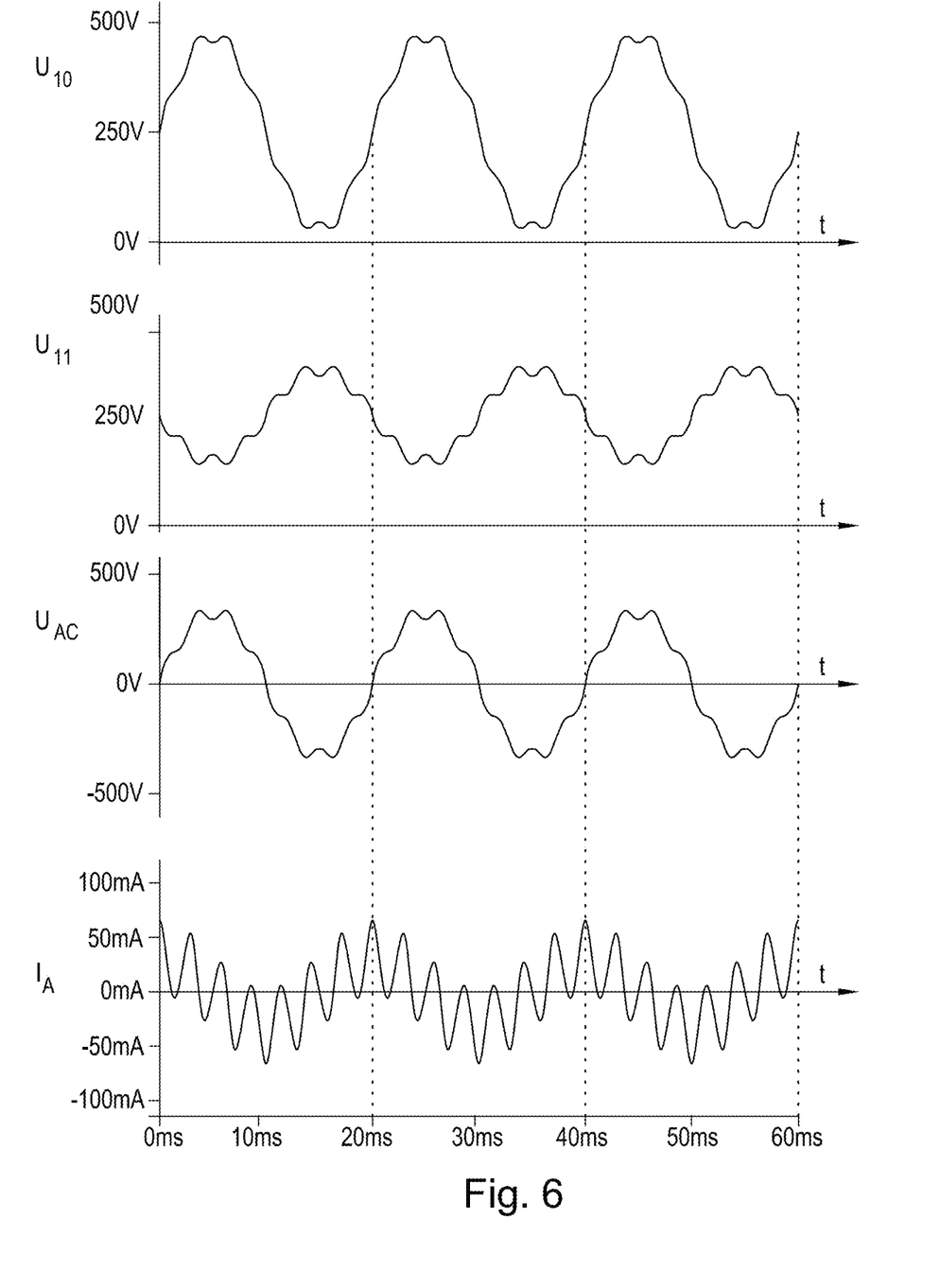
FIG. 6 shows the time curves of the voltages at the AC outputs of the power units and the resulting alternating voltage of the inverter and the resulting leakage current in a faulty supply network with untreated harmonics when applying the method according to the invention according to FIG. 3.

FIG. 6 shows the time curves of the voltages $U_{10}$, $U_{11}$ with harmonics and the resulting optimised leakage current $I_{A,\ opt}$ in a faulty supply network 12 with harmonics when applying the method according to the invention according to FIG. 3. The amplitudes of the voltages shown correspond to those of FIG. 4, i.e. 250 V for $U_{10}$, 75 V for $U_{11}$ and 325 V for $U_{AC}$. The time curves differ from those of FIG. 4 by the superimposition of high-frequency harmonics on the supply network 12, which are correspondingly also transferred to the voltages $U_{10}$ and $U_{11}$. For example, the frequency of the harmonics here is $f_{OW}$=350 Hz. Among other things, due to the superimposition a voltage $U_{11}$ fluctuating to a greater extent on the neutral conductor N comes about, which causes a greater fluctuation in the amplitude of the leakage current $I_A$. As shown here, the amplitude is about 60 mA or the root mean square value is about 33 mA. In this case, the defined maximum leakage current $I_{A,max}$, at which the ground fault circuit interrupter 14 triggers, is exceeded. However, the method according to the invention nevertheless shows its effect because, compared to the prior art according to FIG. 5, the amplitude of the leakage current $I_A$ would fluctuate even more strongly.

Figure 7:
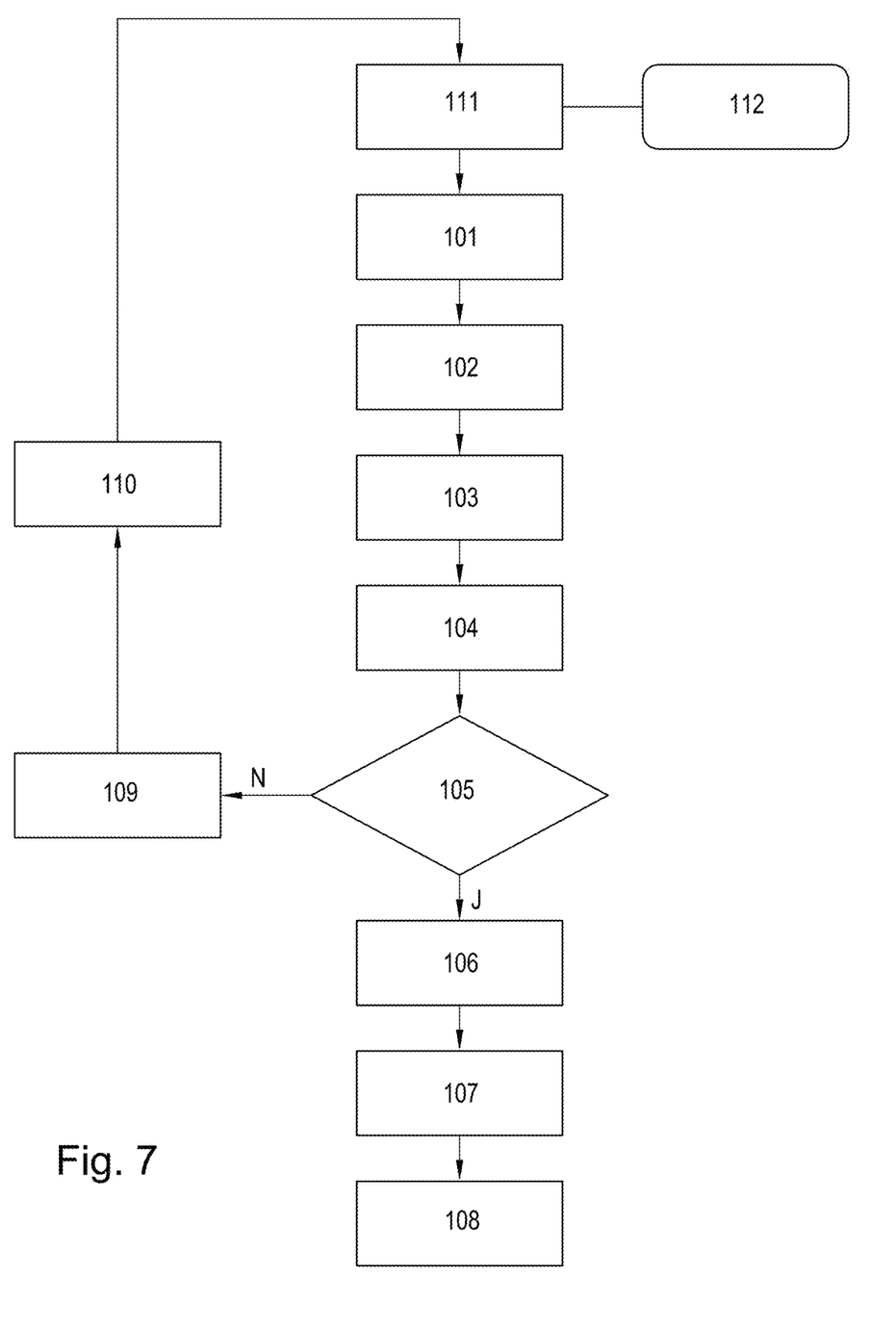
FIG. 7 shows a flow diagram for illustrating another embodiment of a method according to the invention for operating an inverter assembly.

FIG. 7 shows a flow diagram for illustrating another embodiment of a method according to the invention for operating an inverter assembly 1. Compared to the flow diagram according to FIG. 3, a step 111 has been added here, in which before and/or during the feed-in operation of the at least one inverter 2, harmonics of the alternating voltage $U_{AC}$ at the AC output 10, 11 are determined and taken into consideration when the power units 7, 8 of the inverter 2 are modulated. The network analysis according to step 111 can be carried out by determining the harmonics at certain frequencies $f_{OW}$ in step 112. By taking into consideration such harmonics that often occur in reality, the method according to the invention can be further improved as illustrated with reference to FIG. 8, which ultimately leads to an even better energy balance.

Figure 8:
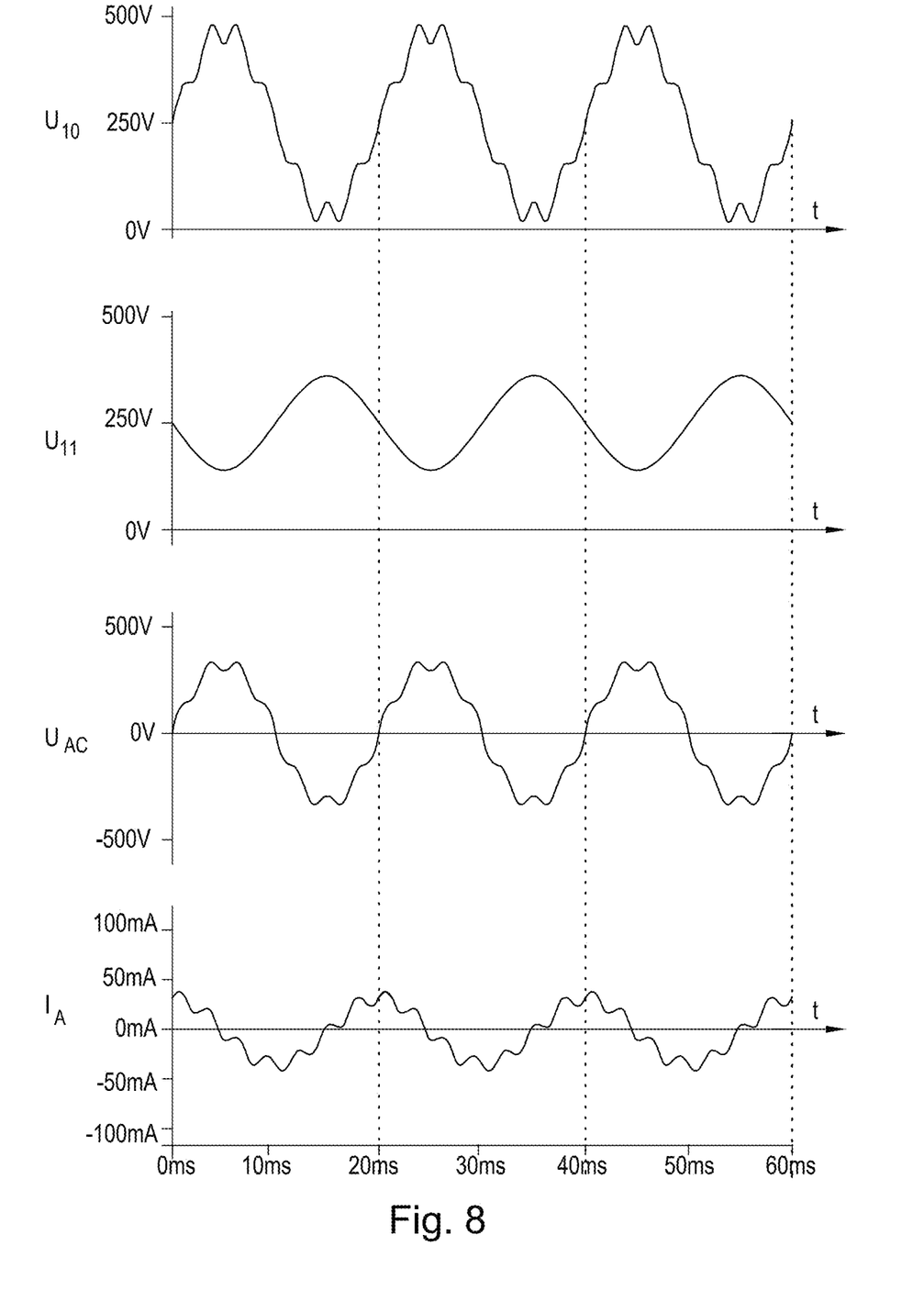
FIG. 8 shows the time curves of the voltages at the AC outputs of the power units and the resulting alternating voltage of the inverter and the resulting leakage current in a faulty supply network with attenuated harmonics in the method according to the invention according to FIG. 6.

FIG. 8 shows the time curves of the voltages $U_{10}$, $U_{11}$ at the AC outputs 10, 11 of the power units 7, 8 and the resulting alternating voltage $U_{AC}$ of the inverter 2 and the resulting leakage current $I_A$ in a faulty supply network 12 with attenuated harmonics, and of the optimised leakage current $I_A$ in the method according to the invention according to claim 9. In this case, the determined harmonics are correspondingly attenuated by modulating that power unit 7 of the inverter 2 which is connected to the neutral conductor N of the supply network 12, as can be seen from the time curve of the voltage $U_{11}$. This attenuation is correspondingly corrected by modulating that power unit 8 of the inverter 2, which is connected to the AC output 10, which is connected to the phase connection L of the supply network 12. The correction or attenuation takes place in such a way that the high-frequency ratios of the voltage $U_{11}$ are transmitted to the voltage $U_{10}$ through corresponding filters in the power units 7, 8. This is evident from the double amplitude of the superimposed oscillation on the voltage $U_{10}$ compared to the voltage $U_{10}$ of FIG. 7. Accordingly, the voltage $U_{11}$ no longer has any high-frequency ratios.

There comes about an optimised leakage current $I_A$ with a lower superposition of harmonics, which is why the leakage current $I_A$ remains below the maximum leakage current $I_{A,max}$, as long as the ambient conditions (low insulation resistance, high leakage capacitance, little network interference, hardly any harmonics, . . . ) permit this. As shown here, the amplitude is about 40 mA or the root mean square value is about 23 mA. Thus, an even longer energy feeding comes about.

Figure 9:
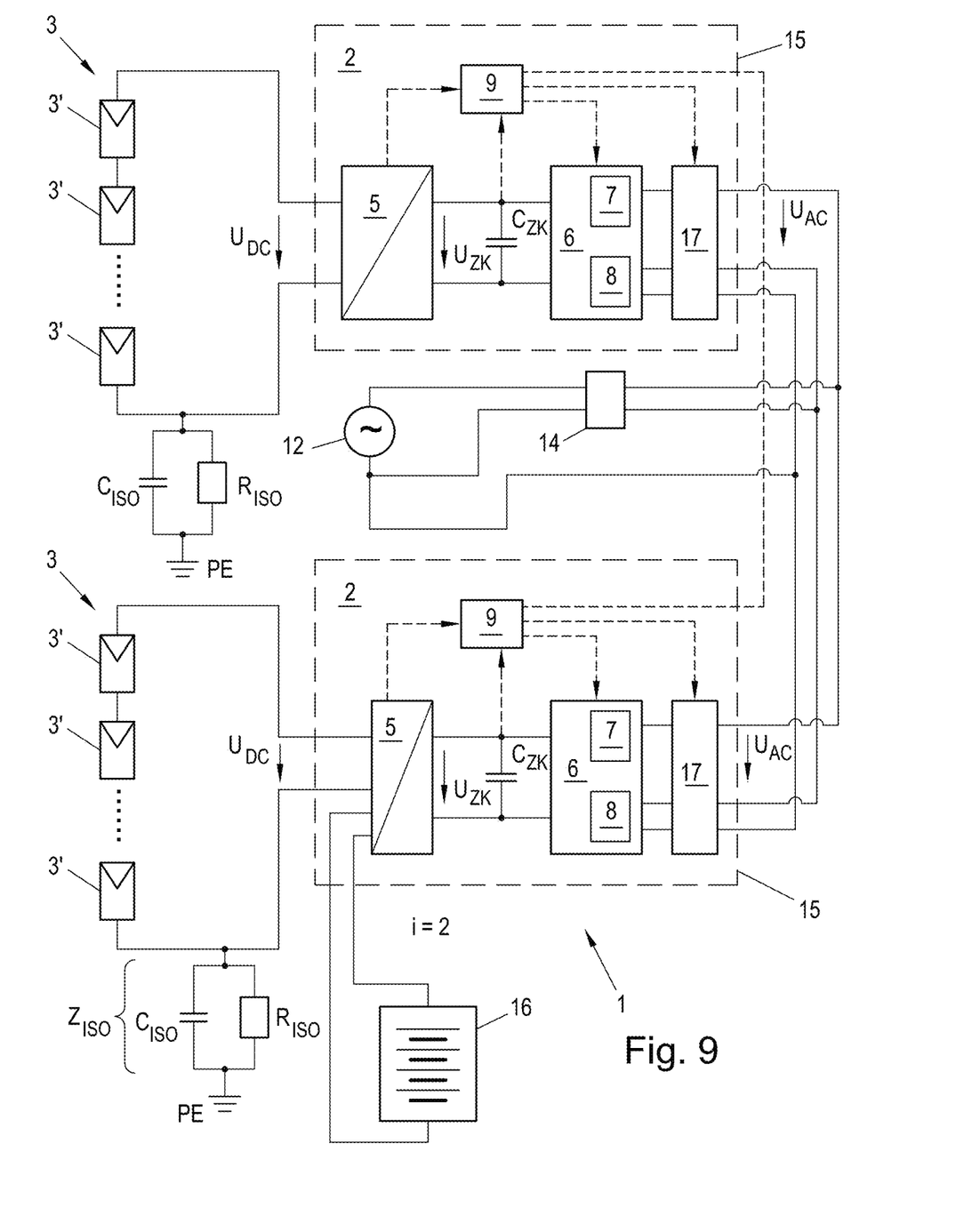
FIG. 9 shows a block diagram of an inverter assembly having a plurality of inverters and a battery.

FIG. 9 shows the block diagram of an inverter assembly 1 having two inverters 2 and a battery 16 for buffering the energy obtained. More than two inverters 2 can also be arranged in parallel in the inverter assembly 1 and connected together to the supply network 12. The control devices 9 can be connected to one another via a communication line 15. In the simplest case, the defined maximum leakage current $I_{A,max}$, at which the common ground fault circuit interrupter 14 of the inverter assembly 1 triggers, can be divided by the number i of inverters 2, here two, and half the defined maximum leakage current $I_{A,max}/2$ can be used for each inverter as the basis or new maximum leakage current $I_{A,max}'$ for this inverter 2, and the method according to the invention (according to FIG. 3 or FIG. 7) can be carried out for each inverter 2 with this maximum leakage current $I_{A,max}'=I_{A,max}/2$.

Also, another possibility is assigning the maximum leakage currents $I_{A,max}'$ of the individual inverters 2 according to their rated power. Inverters 2 of the inverter assembly 1 with greater rated power would then be assigned a greater proportion of the total maximum leakage current $I_{A,max}$ than inverters 2 with lower rated power.

In a yield-optimised variant of an inverter assembly 1 having a plurality of inverters 2, it could also be calculated for each inverter 2 how much rated power it can convert per mA leakage current $I_A$. This will be different for each inverter 2 due to different leakage capacitances $C_{iso}$. The maximum total leakage current $I_{A,max}$ is assigned to the inverter 2 with the lowest leakage capacitance $C_{is}$, per rated power. If the entire quota has not yet been exhausted, the next inverter 2 available is supplied, and so on. As a result, a maximum yield can be achieved at a defined maximum total leakage current $I_{A,max}$.

Finally, in inverter assemblies 1 having a plurality of inverters 2, other aspects of the individual inverters 2, such as service life, operating hours or the like, may also play a role and be taken into consideration when the method according to the invention (according to FIG. 3 or FIG. 7) is applied.

The method according to the invention (according to FIG. 3 or FIG. 7) for operating an inverter assembly 1 having at least one, preferably a plurality of inverters 2 minimises the problem of deactivating the inverters 2 in the event that the defined maximum leakage currents $I_{A,max}$ are exceeded, by minimising the leakage currents $I_A$ by special modulation of the power units 7, 8 of the inverters 2, taking into consideration the leakage capacitance $C_{iso}$ and the connection situation. Since this can increase the feed-in time and feed-in power, a better energy balance and, as a result, higher yields for the operator of the inverter assembly 1 come about.

The invention claimed is:

1. A method for operating an inverter assembly having at least one inverter for converting respectively a direct voltage into an alternating voltage with a mains frequency,
   wherein in the at least one inverter, the direct voltage of a DC source connected to a DC input is transformed via a DC/DC-converter to an intermediate circuit voltage, and the intermediate circuit voltage is converted in a DC/AC-converter having two power units, each connected to an AC output, which are mutually modulated by a control device, into the alternating voltage, which alternating voltage corresponds to the total of the opposite voltages at the AC outputs of the power units opposite the negative pole of the intermediate circuit voltage, and the alternating voltage is fed into a supply network connected to the AC outputs,
   wherein before feeding the alternating voltage into the supply network, a leakage capacitance to ground is determined at the DC input of the at least one inverter, and it is determined which AC output is connected to which line of the supply network,
   wherein, taking into consideration the determined leakage capacitance and a defined maximum leakage current and the determined connection situation at the AC output, the power units of the at least one inverter are asymmetrically modulated by the control device in such a way that the amplitudes of the voltages at the AC outputs of the power units, which correspond to the alternating voltage to be fed in the supply network, differ in size, the modulation of the power unit of the DC/AC-converter connected to the phase connection of the supply network taking place in such a way that the voltage with the greater amplitude comes about at the AC output of this power unit, and the modulation of the power unit of the DC/AC-converter connected to the neutral conductor of the supply network takes place in such a way that the voltage with the lower amplitude comes about at the AC output of this power unit, as a result of which the leakage currents are minimized and the at least one inverter is connected without the risk of exceeding the defined maximum leakage current, and wherein in an event that the maximum leakage current is reached, a predetermined period of time is waited and, before feeding the alternating voltage into the supply network, the leakage capacitance to ground at the DC input of the at least one inverter is determined again and it is checked again whether the defined maximum leakage current is exceeded.

2. The method according to claim 1 wherein the modulation of the power units of the at least one inverter is changed linearly within predetermined limits as a function of the measured leakage capacitance.

3. The method according to claim 1, wherein upon reaching predetermined upper limit values for the measured leakage capacitance of the at least one inverter, the respective at least one inverter remains deactivated or is deactivated.

4. The method according to claim 1, wherein, before the feed-in operation of the at least one inverter, an ohmic insulation resistance to ground is measured at the DC input of the at least one inverter and is taken into consideration in addition to the leakage capacitance when modulating the power units.

5. The method according to claim 4, wherein the location of a connection of the DC source to the ground is determined and the determined location is taken into consideration when modulating the power units of the at least one inverter.

6. The method according to claim 1, wherein before and/or during the feed-in operation of the at least one inverter, harmonics of the alternating voltage at the AC output are determined and taken into consideration when modulating the power units of the at least one inverter.

7. The method according to claim 6, wherein the determined harmonics are attenuated by modulating that power unit of the at least one inverter, which is connected to the AC output, which is connected to the neutral conductor of the supply network, and this attenuation is correspondingly corrected by modulating that power unit of the at least one inverter, which is connected to the AC output, which is connected to the phase connection of the supply network.

8. The method according to claim 1, wherein during the feed-in operation of the at least one inverter, the amplitude of the alternating voltage is determined and taken into consideration when modulating the power units of the at least one inverter.

9. The method according to claim 1, wherein the at least one inverter comprises a plurality of inverters and the respective power units of each inverter of the plurality of inverters are modulated as a function of the measured system capacitance of each inverter of the plurality of inverters.

10. The method according to claim 9, wherein the defined maximum leakage current is divided by the number of all inverters of the plurality of inverters in the inverter assembly.

11. The method according to claim 9 wherein the direct voltage is measured at the DC input of each inverter of the plurality of inverters and is taken into consideration when modulating the power units of each inverter of the plurality of inverters.

12. The method according to claim 9, wherein the number of inverters of the plurality of inverters in the inverter assembly is determined via communication lines between the inverters.

13. An inverter assembly having at least one inverter for converting respectively a direct voltage into an alternating voltage with a mains frequency, wherein the at least one inverter has a DC/DC-converter for transforming the direct voltage of a DC source connected to a DC input into an intermediate circuit voltage, a DC/AC-converter having two power units for converting the intermediate circuit voltage into the alternating voltage, wherein a control device is provided for modulating the power units of each inverter, wherein the control device is configured to carry out the method according to claim 1.

* * * * *